US007718101B2

(12) United States Patent
Gruber et al.

(10) Patent No.: US 7,718,101 B2
(45) Date of Patent: May 18, 2010

(54) PROCESS FOR THE PRODUCTION OF A FRICTION MATERIAL BASED ON A SHEET-LIKE CARBON FIBER WOVEN FABRIC FOR WET-FRICTION ELEMENTS

(75) Inventors: Udo Gruber, Neusäss (DE); Sebastian Grasser, Friedberg (DE); Eugen Pfitzmaier, Thierhaupten (DE); Reiner Bode, Aindling (DE); Gernot Hochegger, Vienna (AT)

(73) Assignee: SGL Carbon SE, Wiesbaden (DE)

( * ) Notice: Subject to any disclaimer, the term of this patent is extended or adjusted under 35 U.S.C. 154(b) by 84 days.

(21) Appl. No.: 10/884,068

(22) Filed: Jul. 1, 2004

(65) Prior Publication Data

US 2005/0025951 A1 Feb. 3, 2005

(30) Foreign Application Priority Data

Jul. 29, 2003 (DE) ................................ 103 34 881

(51) Int. Cl.
 *C01B 31/02* (2006.01)
 *B29C 43/02* (2006.01)
(52) U.S. Cl. ...................... 264/29.2; 264/29.5; 264/324
(58) Field of Classification Search ................ 264/29.1, 264/29.2, 257, 258, 29.5, 324; 428/299.1
See application file for complete search history.

(56) References Cited

U.S. PATENT DOCUMENTS

| 5,057,254 | A | * | 10/1991 | Sohda et al. ................ 264/29.2 |
| 5,059,273 | A | | 10/1991 | Boyce et al. |
| 5,382,392 | A | * | 1/1995 | Prevorsek et al. .......... 264/29.5 |
| 5,662,993 | A | | 9/1997 | Winckler |
| 5,858,511 | A | * | 1/1999 | Lisowsky .................... 428/167 |
| 5,895,716 | A | * | 4/1999 | Fiala et al. .................. 428/408 |
| 5,952,249 | A | | 9/1999 | Gibson et al. |
| 2004/0147192 | A1 | | 7/2004 | Connors, Jr. et al. |

FOREIGN PATENT DOCUMENTS

DE 690 24 909 T2 5/1991

* cited by examiner

*Primary Examiner*—Mathieu D. Vargot
(74) *Attorney, Agent, or Firm*—Laurence A. Greenberg; Werner H. Stemer; Ralph E. Locher (57) ABSTRACT

A process for producing a friction material based on a sheet-like carbon fiber woven fabric for wet-friction elements, such as clutch linings or synchronizing ring linings. The woven fabric of carbon fibers is impregnated with a binder, in particular with a resin, to form a binder-impregnated fiber material. The prepreg is cured for a curing period under a curing temperature which is elevated with respect to the ambient temperature and is pressed mechanically on its surfaces with a pressing mold before the start and/or at least during part of the curing period.

24 Claims, 5 Drawing Sheets

PROCESS FOR THE PRODUCTION OF A FRICTION MATERIAL BASED ON A SHEET-LIKE CARBON FIBER WOVEN FABRIC FOR WET-FRICTION ELEMENTS

BACKGROUND OF THE INVENTION

Field of the Invention

The invention relates to a process for the production of a friction material based on a sheet-like carbon fiber woven fabric for wet-friction elements, such as clutch linings or synchronizing ring linings. The process includes impregnation of the carbon fiber woven fabric with a binder to form a fiber material impregnated with binder (prepreg).

In such wet-friction elements, a wet medium, for example oil, serves to remove the heat formed by the sliding contact from the friction surfaces of the friction partners. A generic process is known from U.S. Pat. No. 5,662,993 and relates to friction material of resin-impregnated woven fabric woven from carbonized fibers.

Such a woven fabric either is produced from yarns which are made of already carbonized fibers, or a woven fabric is first produced from a yarn of polyacrylonitrile fibers and is then carbonized as a whole. The woven fabric is impregnated with resins, so that the intermediate spaces between the individual carbon fiber strands in the yarns from which the woven fabric is built up are partly filled by the resin. This resin can be converted partly or completely into amorphous carbon by pyrolysis.

Such a woven fabric has a texture/surface morphology which provides reservoirs and outflow routes for the oil. The woven fabric includes on the one hand open intermediate spaces between the individual threads of the woven fabric (macro-texture) and on the other hand pores and gaps between the individual fiber strands within the threads (microtexture). The friction material can then be flushed through with oil, in order to remove the heat of friction transferred to the oil. Furthermore, a surface which is too smooth and flat promotes the formation of a hydrodynamic lubricant film which is undesirable for the frictional engagement.

During the impregnation of the woven fabric with the resin, it may be necessary to remove excess resin. According to the above-mentioned specification, application of pressure should be expressly avoided here, in order not to destroy the microtexture and macrotexture of the friction material. However, the microtexture and the macrotexture of the friction material are also a disadvantage to a certain extent, since they allow, at the moment of contact of the wet-friction partners, the oil to escape from the surface into the inside of the friction material as a result of the contact pressure, from where, because of the relatively high flow resistance of the flow paths formed by the microtexture and the macrotexture, it can be removed again from the friction material only with difficulty in order to introduce the heat transported with it into the part of the oil circulation which lies outside the wet-friction elements, for example into a clutch housing or gearbox housing. In contrast, it would be more favorable if the oil escapes not exclusively into the inside of the wet-friction elements, but at least some of the oil were to flow out along the surface of the wet-friction elements in a desired flow direction and at the same time new or already cooled oil were to flow back.

The woven fabric known from U.S. Pat. No. 5,662,993 has a braided structure, in which the plateaus of the weft threads and of the warp threads project out of the woven fabric at the same height. A so-called linen-weave woven fabric with a checkerboard-like arrangement of crossing points with warp threads lying on top and crossing points with weft threads lying on top is formed. However, the prior art arrangement of crossing points in the checkerboard pattern impedes a flow of oil along the surface of the wet-friction elements.

SUMMARY OF THE INVENTION

It is accordingly an object of the invention to provide a method of the above-mentioned type which overcomes the above-mentioned disadvantages of the heretofore-known devices and methods of this general type and which provides for a friction material which on the one hand ensures favorable friction properties and a good removal of heat under use conditions and on the other hand has a high mechanical rigidity and fatigue strength.

With the foregoing and other objects in view there is provided, in accordance with the invention, a process for the production of a friction material for wet-friction elements, the method which comprises:

providing a sheet-like carbon fiber woven fabric;

impregnating the carbon fiber woven fabric with a binder to form a binder-impregnated fiber material;

curing the binder-impregnated fiber material over a curing period at a curing temperature higher than ambient temperature; and mechanically pressing surfaces of the binder-impregnated fiber material with a pressing mold at a time prior to the curing period and/or during the curing period.

The novel method is particularly suitable for producing clutch linings and synchronizing ring linings.

In accordance with an added feature of the invention, the material is pressed at a pressing pressure in a range between 4 and $8 \cdot 10^5$ Pa. Preferably, the content of the binder, based on a total weight of the friction material, is in a range between 25 and 50 wt. %. Curing is effected at a curing temperature in a range between 50 and 180° C.

Preferred binders are phenolic resins.

In accordance with an additional feature of the invention, the binder-impregnated fiber material in lined on each side with a release film, prior to the pressing step.

In accordance with another feature of the invention, threads of heat-stabilized polyacrylonitrile fibers are woven to a woven fabric, or the woven fabric of threads of polyacrylonitrile fibers is subsequently heat-stabilized. Then, the woven fabric is carbonized.

In a preferred mode of the process, the threads are woven into one another to form channel-type depressions on at least one surface of the woven fabric. In a further preferred mode, the fabric is woven with a twill weave.

In accordance with a further feature of the invention, the material is pressed with a pressing mold having substantially smooth pressing surfaces facing the binder-impregnated fiber material.

In an alternative embodiment, the material is pressed with a pressing mold and/or a release film having at least one structured surface facing the binder-impregnated fiber material. Preferably, the pressing mold and/or the release film is configured to form channel depressions in at least one surface of the binder-impregnated fiber material.

In a preferred embodiment of the invention, particles of graphite or carbon black are added to the binder. It is also advantageous to partly or completely carbonize the binder.

In accordance with again an added feature of the invention, the pressing step is started with a time delay after a start of the curing period and ended together with an end of the curing period.

With the above and other objects in view there is also provided, in accordance with the invention, a friction material formed in a sheet-like carbon fiber woven fabric for wet-friction elements, and produced by the process outlined above.

Furthermore, there is provided, in accordance with the invention, a friction material for wet-friction elements, comprising a sheet-like carbon fiber woven fabric and a resin binder cured under elevated temperature relative to ambient temperature and under raised pressure in a pressure mold, the friction material having a relative compressibility of between 8% and 10% and a relative resilience of between 80% and 90%.

The advantages of the invention may be explained as follows: By pressing the prepreg, the compressibility of the friction material is reduced so that in the later frictional use it has virtually no more compressibility reserves and consequently retains its measurements in a dimensionally stable manner. At the same time the rigidity of the friction material is increased. The desired thickness of the friction material can furthermore be established accurately with narrow tolerances by the pressing operation. Otherwise, the friction material would have to be brought to the desired thickness by mechanical working of the surface, for example grinding. In such a grinding process, however, the fibers and threads running on the surface are damaged, so that the integrity of the woven fabric is impaired. Furthermore, the pressing operation has the effect of a further compaction of the material, so that the permeability thereof decreases. By the flow of the binder under the pressure loading, the distribution of the resin is made more uniform, so that the structure of the friction material becomes more homogeneous. In addition, the binder flow which takes place under pressure causes an at least partial closure of the pores or a reduction in the size of the pores, which is equivalent to compaction of the material. By the measures mentioned the outflow of oil into the inside of the material is reduced and that along the surface of the material is promoted, which results in an improved removal of heat.

Other features which are considered as characteristic for the invention are set forth in the appended claims.

Although the invention is illustrated and described herein as embodied in a process for the production of a friction material based on a sheet-like carbon fiber woven fabric for wet-friction elements and friction material produced by the process, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

All woven fabrics which have a pronounced furrow structure are preferably suitable as the starting material for the friction material according to the invention. Woven fabrics with a twill weave are a typical example of these. Weave lines which run diagonally to the warp and weft threads over the woven fabric surface are characteristic of twill weave. Woven fabrics produced in this way are characterized by a continuous, for example diagonal, striation of lower-lying regions, which are called furrows or channel-like depressions in the following, and elevated regions, which are called ridges in the following. The oil in the furrows which form oil channels can then flow out unimpeded along the surface in an advantageous manner and consequently transport away heat of friction, the furrows being filled up again by the oil contained, for example, in the clutch housing or gearbox housing. The channel-like furrows or depressions can be aligned in any direction, in particular during fixing of the friction material to the substrate, for example a clutch disc or a synchronizing ring, and consequently also in an accentuated direction in which an inflow and outflow of oil from and to adjacent regions is particularly simple. In particular, the channel-like furrows or depressions can be aligned according to a given oil flow within a clutch housing or a gearbox housing.

Figure 1:
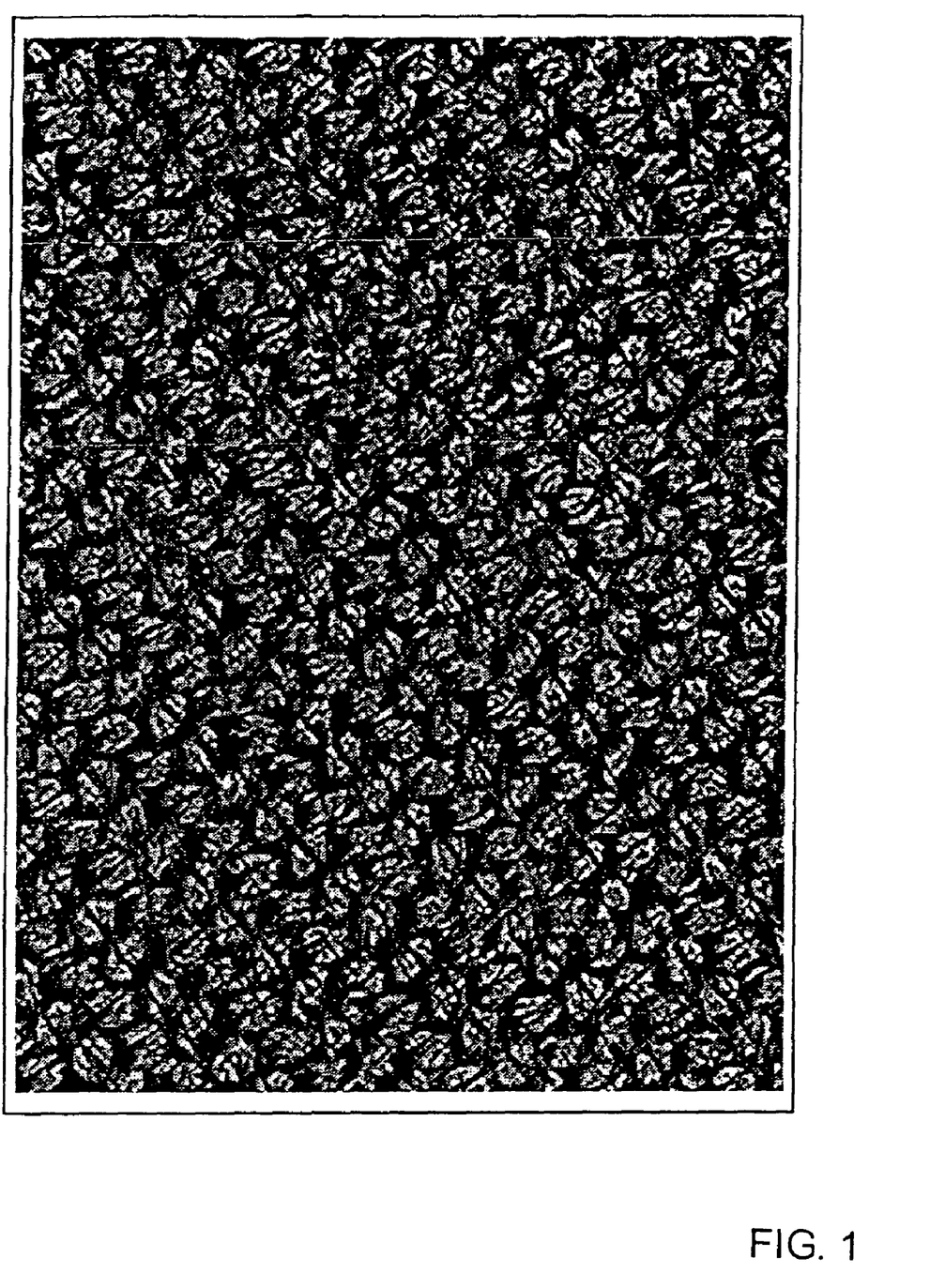
FIG. 1 is a plan view of a starting woven fabric for the process according to the invention according to a preferred embodiment in 10-fold magnification.
Figure 2:
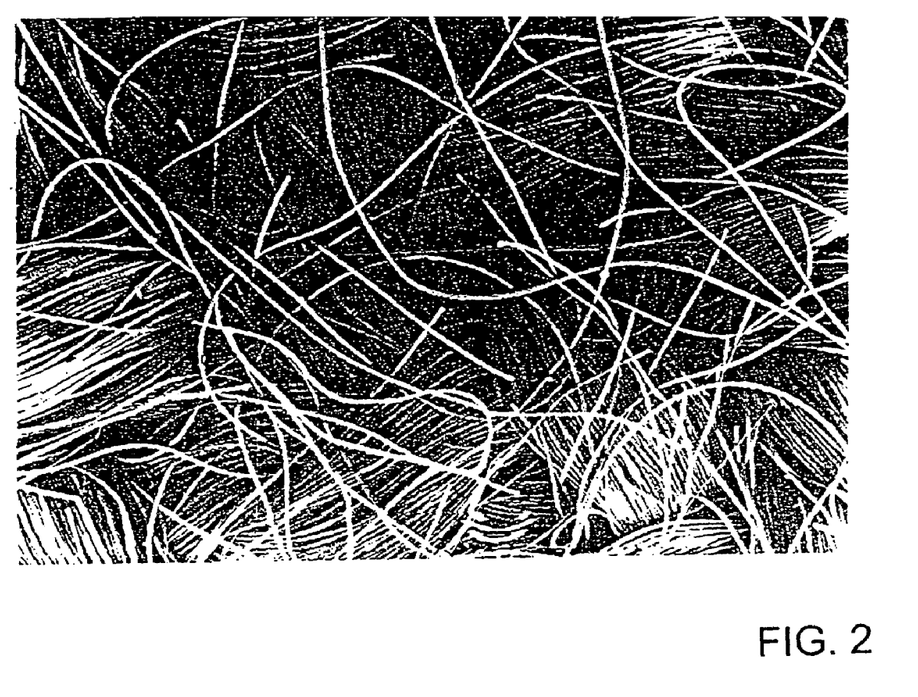
FIG. 2 is a plan view of the starting woven fabric from FIG. 1 in 34-fold magnification.

A preferred example of a suitable starting woven fabric for production of friction materials according to the invention is shown in FIGS. 1 and 2. This is a woven fabric of the twill 2/2 weave type with in each case 130 warp and weft threads per 10 cm, the threads being twisted threads with a denier of 143 tex (14/2 Nm (number metric)) and a weight per unit area of 400 g/cm$^2$. While the diagonal structuring of the woven fabric can be clearly seen in FIG. 1, FIG. 2 shows a smaller section from the woven fabric with detectable individual crossing points, depressions or small openings between the individual threads and pores between the individual fiber strands in the threads.

In a particularly preferred variant, a one-sided woven fabric is used, i.e. the ridge and furrow structure is more pronounced on one side of the woven fabric than on the other. The more structured side of the woven fabric is then envisaged as the friction surface, while the smoother side is more suitable for adhesive joining to the substrate, for example by way of a clutch or synchronizing ring lining carrier, since it has a larger and more closed adhesion surface than the surface with the furrow and ridge structure. An example of such a woven fabric having one structured and one smooth surface is woven fabric with the twill 2/1 weave type.

Figure 3:
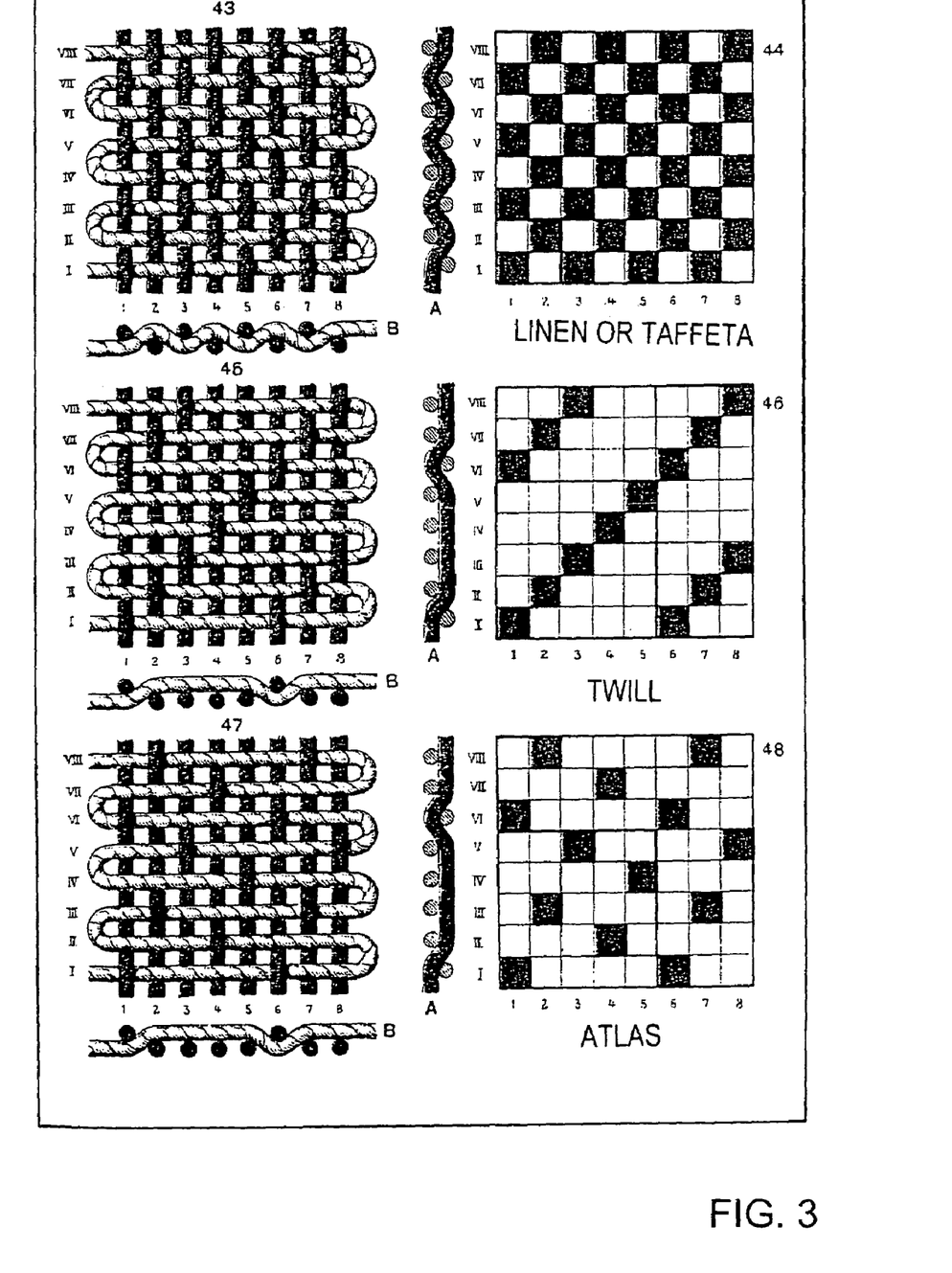
FIG. 3 is a diagram of the structure of various types of woven fabric.

FIG. 3 shows a diagram of the structure of woven fabrics with various types of basic weaves. Compared with twill woven fabric with relatively wide continuous furrows, linen-weave woven fabric has no diagonally running furrows, but a chessboard-like arrangement of crossing points with warp threads lying on top and crossing points with weft threads lying on top. Woven fabrics with satin weave or atlas weave, on the other hand, are characterized by crossing points lying individually, so that here also no continuous diagonal furrows and ridges can form. These woven fabrics therefore are not the preferred starting material for the production of the friction materials according to the invention, but it is possible to impress a suitable surface structure on these woven fabrics in the impregnated state, as will be explained below.

The threads for production of the woven fabric either comprise polyacrylonitrile (PAN) fibers which have already been heat-stabilized, or a woven fabric of PAN fibers is subjected to a heat stabilization before the carbonization. During the heat stabilization, the PAN fibers are converted into a non-fusible form by atmospheric oxidation at preferably 200-400° C., while stretching. Yarns spun from stretch-broken oxidized polyacrylonitrile fibers have proved to be particularly suitable for production of the abovementioned fabric. The yarn titre is between 120 and 170 tex. Twisted yarns are preferably used, and particularly preferably twisted yarns which are obtained by twisting two threads twisted in opposite directions, or threads obtained by twisting several twisted threads with one another. A significant advantage of these twisted threads is that the individual fibers cannot lie flat side by side in a plane under the action of pressure, that is to say the threads always have a certain three-dimensional structure.

The woven fabric is then carbonized, i.e. heat-treated at a temperature of between 900 and 2,500° C. with exclusion of air. It is more advantageous first to produce the woven fabric and then to carbonize this as a whole than to produce a woven fabric from threads of fibers which have already been carbonized, since carbon fibers are considerably more rigid and more brittle than the starting fibers. During the carbonization, the carbon content of the fibers is increased due to the release of hydrogen, oxygen and heteroatoms, in particular nitrogen, and the degree of crosslinking of the carbon skeleton in the filaments is increased. If the heat treatment is carried out at 1,000° C., a carbon content, based on the weight, of approx. 80% is obtained, and at higher temperatures an even higher carbon content is reached. For example, a carbon content, based on the weight, of 95% is obtained if the heat treatment is carried out at 1,800° C. As a rough approximation, for the abovementioned range of carbonization temperatures: The higher the treatment temperature, the higher the carbon content of the fibers and the higher the heat stability and the elasticity modulus of the material.

In a subsequent process step, the woven fabric is soaked/impregnated with a binder, preferably with resin. Phenolic resins, which are used as liquid resin or as a melt (hot melt resin), are preferably used. A prepreg, i.e. a sheet-like fiber material impregnated with plastic (resin), the plastic impregnation of which has not yet cured, is obtained in this manner.

The process steps of heat treatment and of impregnation are preferably carried out continuously, i.e. the woven fabric is rolled off from a reel, passed through one or more ovens with the appropriate temperature and atmosphere and then passed through a resin bath, a calender or another impregnating device. The resin is then cured, so that a composite material is obtained, in which the matrix of plastic is reinforced by the carbon fiber woven fabric (carbon-fiber-reinforced plastic CFRP). This process can be carried out either in a continuous or in a discontinuous manner.

The resin fulfills several functions in the friction material according to the invention. Firstly, it acts as a binder which binds the threads of the woven fabric to one another and fixes them in their position in the woven fabric. At low resin contents the fiber strands are merely covered with a superficial resin film, but at higher resin contents they are embedded in a thick resin matrix and are therefore also protected from mechanical stresses, for example by friction. Furthermore, the woven fabric is reinforced mechanically by the binder addition, i.e. it becomes more rigid and its compressibility is reduced.

The resin impregnation furthermore reduces the permeability of the woven fabric to oil and therefore the flow of oil at right angles to the surface of the friction material. A complete outflow of oil into the inside of the friction material is undesirable, since the oil is required at the surface of the friction material in sliding contact with the counterpart of the friction device, in order to take up the heat of friction and remove it laterally along the furrows or channel-like depressions. On the other hand, the resin film smoothes the surface of the individual fiber strands and of the entire woven fabric structure. However, complete levelling of the advantageous structure of the woven fabric consisting of ridges and furrows must be prevented by an appropriate metering of the resin.

Figure 4:
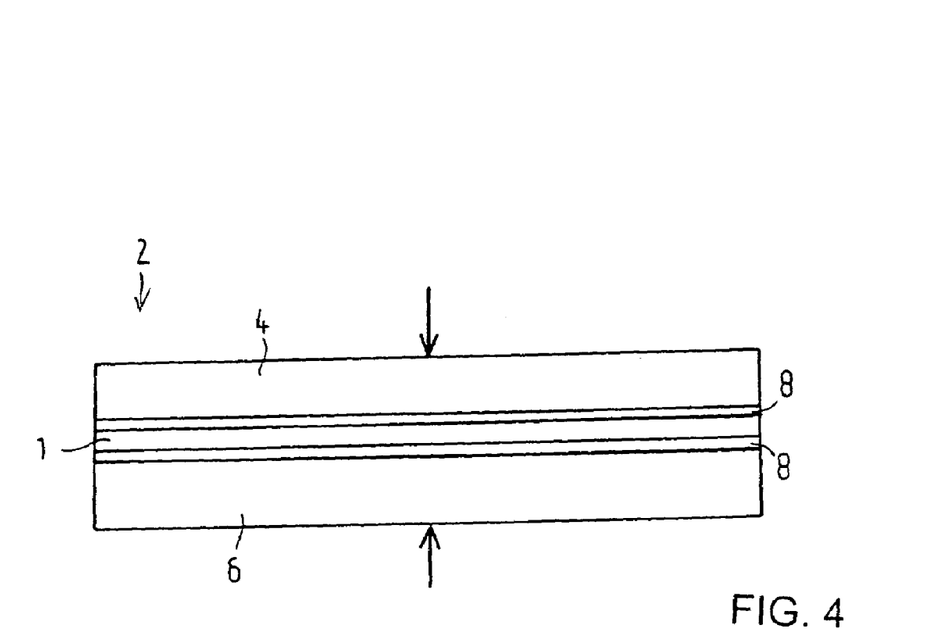
FIG. 4 is a diagram of a pressing operation on the starting woven fabric impregnated with resin.

The woven fabric 1 impregnated with resin is pressed with the aid of a pressing mold 2 shown in FIG. 4, comprising a pressing ram 4 and a pressing die-plate 6, under a pressing pressure of preferably 4-8-105 Pa at a curing temperature of, for example, 50-180° C., the prepreg 1 preferably being lined on each side with a release film 8 before the pressing. The release films 8 are peeled off from the surface of the prepreg 1 after removal of the prepreg from the pressing mold 2. The choice of curing temperature within the range stated depends on the nature of the resin.

These measures on the one hand have the effect of curing of the resin and on the other hand the impregnated woven fabric is compacted to the desired thickness. Typical thicknesses of friction materials for uses in the automobile sector are between 0.2 to 0.7 mm with thickness tolerances of ±10%. The further advantages which result from pressing of the prepreg have already been described in detail above.

Figure 5:
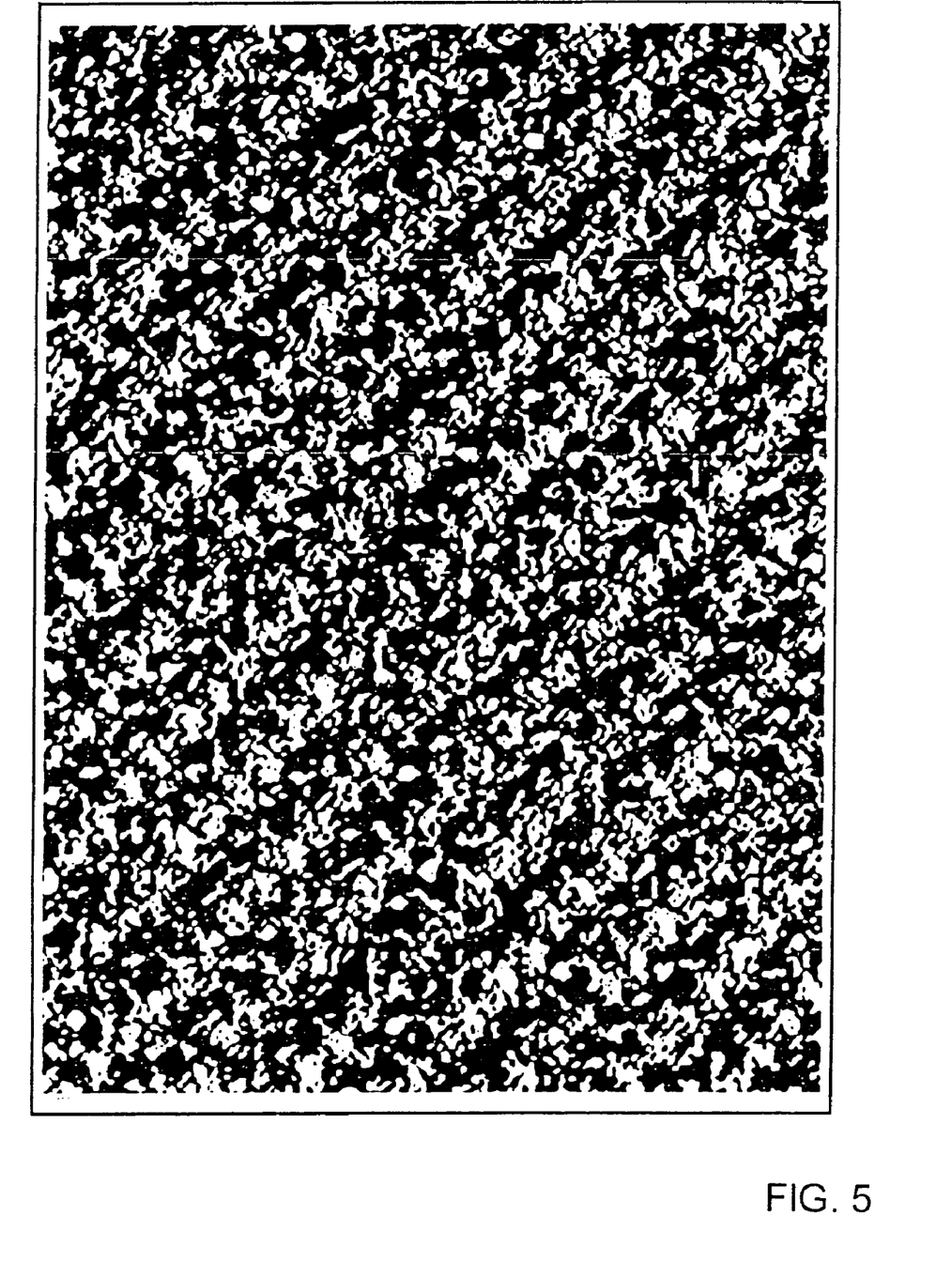
FIG. 5 is a detail view of a friction material according to the invention according to a preferred embodiment in 10-fold magnification.
Figure 6:
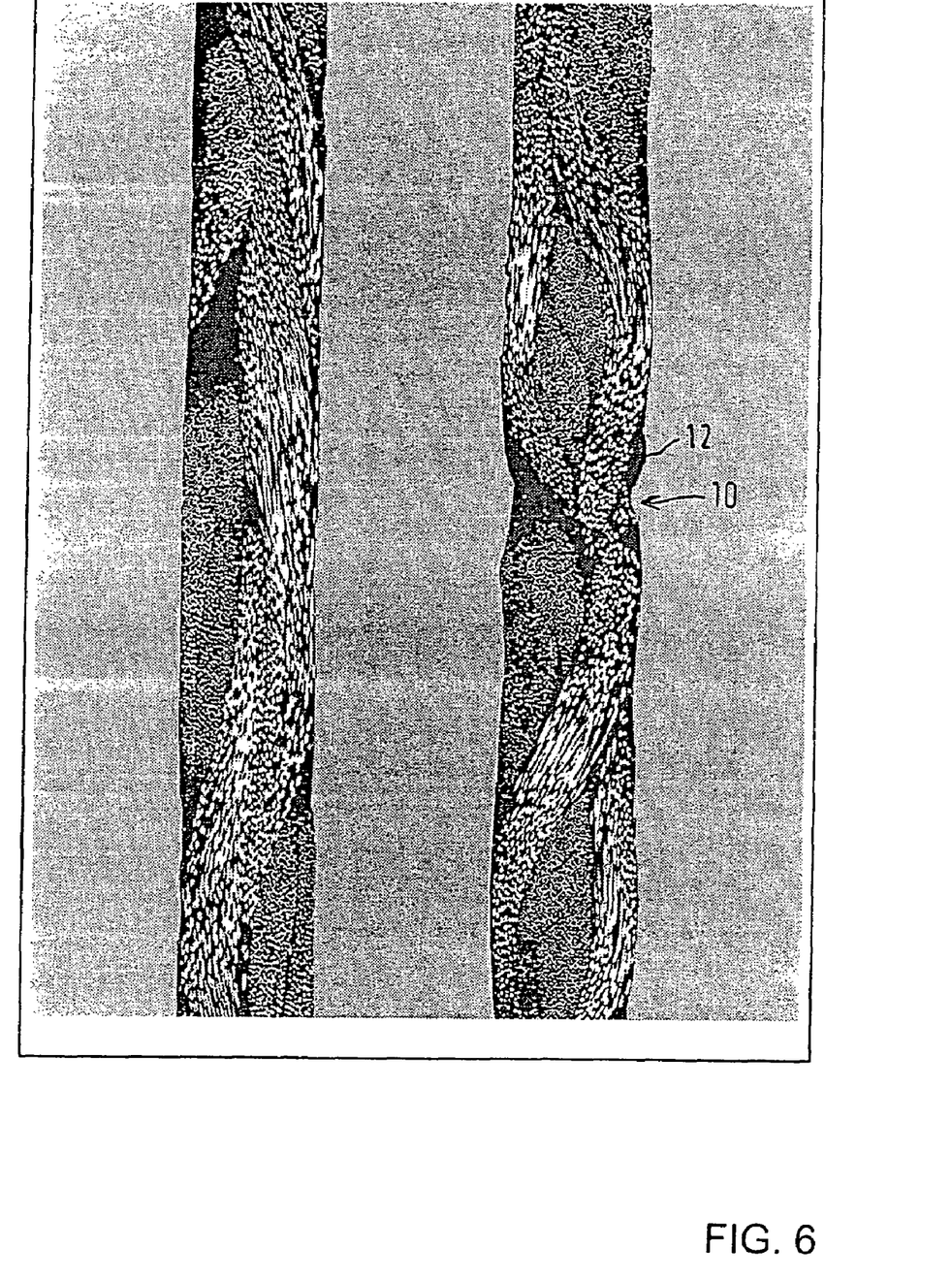
FIG. 6 is a detail view of a cross-section through the friction material according to the invention of FIG. 5 in 120-fold magnification.

It has been found, surprisingly, that the original structure of the woven fabric of ridges and furrows is also still retained detectably after the pressing operation. This can be seen in FIG. 5, which shows a pressed impregnated woven fabric with a resin content, based on the weight, of 50%. Although the differences in height between the ridges and furrows are evidently less pronounced than in the starting material (FIG. 1), the diagonal depressions of the woven fabric are still detectable. When the material is viewed at a higher magnification (FIG. 6), it is found that the fibers are largely embedded in a resin matrix, but the channel-like depressions 10 and the ridges 12 of the woven fabric projecting out of the plane are still present. Because of the high magnification, only one such depression 10 and one such ridge 12 are to be seen in FIG. 6, while the adjacent depressions and ridges already lie outside the image area.

It has been found that the resin content helps to maintain the advantageous structure of the original woven fabric also after the impregnation and after the pressing process. On the one hand the resin content must be sufficiently high to ensure the mechanical stability and rigidity of the prepreg, to lower the compressibility and to reduce the permeability of the friction material to oil, and on the other hand the resin content should not be so high that the ridge and furrow structure is leveled completely by being enclosed completely with a thick resin layer.

It has been found that at a resin content, based on the weight, in the range from 25 to 50% the friction materials also still have a furrow structure which is suitable for the oil flow after pressing under the abovementioned conditions. The roughnesses $R_z$ of these surfaces are approx. 30 to 50 µm, as a result of which the friction material according to the invention has a not very high tendency to form hydrodynamic films, which are undesirable in wet-friction elements.

The influence of the resin content and the pressure loading during curing of the resin on various parameters of the material, such as the roughness $R_z$, the permeability to air and the pore size distribution of the friction material, can be seen from the measurement values summarized in Table 1. The pore size distribution was determined by means of capillary flow porometry, by measurement of a gas flow through the friction material. For this, the flow was measured as a function of the gas pressure applied on a dry specimen and on a specimen wetted with liquid. The wet measurement is decisive for the pore size. The higher the gas pressure, the narrower the pores from which the liquid is displaced. Assuming ideal wetting, the pore size can be calculated from the pressure difference with the aid of the Washburn equation. The ratio of dry flow/wet flow, the so-called filter flow, gives information on the frequency of the pores, so that e.g. an average pore diameter can then be stated. In this context, the so-called bubble point is the point at which the gas pressure applied is sufficient for the first time to generate a flow.

The result found is that the roughness $R_z$ of the friction material decreases due to the pressing operation and with increasing resin content. Furthermore, as the resin content increases the permeability of the friction material to air and the width of the pore size distribution decrease, the latter being in particular at the expense of the small pores. As a rough approximation, it is to be assumed that the permeability to oil also decreases with the permeability to air. This is of advantage because more oil is then available at the friction surface. As a result of the pressing process, the width of the pore size distribution also decreases, the small pores and intermediate spaces between the individual fibers belonging to the microtexture of the material being closed in particular as the resin content increases, while the macrotexture is less severely impaired.

pressed in comprises the depressions already described above, which preferably extend continuously over the entire surface and which form oil channels on the surface.

Preferably, only the surface of the prepreg 1 envisaged as the friction surface is provided with a ridge and furrow structure, while the smooth starting structure which is more suitable for gluing is expediently left on the reverse side envisaged for joining to the substrate.

For this variant, it is advantageous if the threads in the woven fabric still have a certain flexibility, that is to say the woven fabric has a rather looser weave and can adapt in its arrangement to the pattern to be pressed in. Otherwise, the shaping would take effect only on the resin coating of the woven fabric, and ridges which comprise only resin but scarcely any or no fibers would form. Since only the projecting ridges 12 enter into sliding contact with the counterpart, the advantageous friction properties of the fibers would not take effect in this case.

After pressing and curing, the friction material is ready for use and can be fixed to the friction surface of a substrate, for example a clutch disc or a synchronizing ring, by means of a suitable, i.e. heat- and oil-resistant, adhesive. In the case of materials structured on one side, the smoother side, which has a larger closed adhesion surface, is expediently joined to the substrate via the adhesive, while the surface with the ridge and furrow structure acts as the friction surface.

According to a further embodiment, the resin content of the friction material is partly or completely carbonized, for example is converted into carbon by a solid phase pyrolysis in an inert atmosphere at 800-1,500° C. This results in a composite material, the matrix of which comprises carbon and is

TABLE 1

Material parameters of the friction material

| | $R_z$/[µm] | | Permeability to air [cm³/s] pressure difference = | Pore size distribution (measurement with capillary flow porometer) | | | |
|---|---|---|---|---|---|---|---|
| | longi-tudinal | trans-verse | 0.3 bar area = 3.46 cm² | bubble point/[µm] | $d_{90}$/ [µm] | $d_{50}$/ [µm] | $d_{10}$/ [µm] |
| Friction material 50 wt. % resin content, unpressed | 70 | 50 | 2,000 | 200 | 100 | 62 | 20 |
| Friction material 50 wt. % resin content, pressed | 30 | 32 | 600 | 127 | 90 | 42 | 18 |
| Friction material 25 wt. % resin content, pressed | 38 | 48 | 1,300 | 135 | 60 | 20 | 4 |

According to an alternative variant, an advantageous friction material can be obtained by a procedure in which a woven fabric without or with only a very slight ridge and furrow structure is carbonized and impregnated with resin in the manner described above and the prepreg 1 obtained in this way is structured in the course of the pressing operation (FIG. 4). This can be effected with a structured pressing ram 4, or the release films 8 or release papers conventionally inserted between the pressing ram 4 and prepreg 1 during the pressing operation are provided on their side facing the prepreg 1, for example by an embossing process, with a structure which corresponds to the negative of the structure to be produced on the prepreg 1, and this structure is then transferred into the resin, which is still capable of flow. The structure to be reinforced with a carbon fiber woven fabric (carbon-fiber-reinforced carbon "CFC"). During the carbonization, the resin layer shrinks as a result of the loss of matter due to splitting off of volatile constituents. The structure of the cured and pressed friction material shown in FIGS. 5 and 6, in which the furrows are only partly filled with resin and the difference in height between the ridges and furrows is reduced compared with the starting woven fabric, is therefore broken open, i.e. the original ridge and furrow structure of the woven fabric stands out more again. The final structure can be varied in respect of its degree of filling, in that after the carbonization the CFC material is optionally impregnated with resin again and the resin is cured and carbonized. After the last carbonization process, a resin impregnation is optionally again carried out, and is then merely cured but not carbonized.

A further possibility of varying the degree of filling of the pores of the friction material comprises adding to the impregnating resin particles of graphite or carbon black, which do not shrink during the carbonization.

Carbon-fiber-reinforced carbon materials are distinguished in particular by their high heat resistance, since they virtually no longer contain thermally degradable constituents. Another outstanding feature is the high mechanical stability and rigidity and the resulting high resistance of the material to stresses, including under a changing intensity of the stresses. These advantageous properties are combined with a low specific gravity. Carbon-fiber-reinforced carbons are lighter than the carbon-fiber-reinforced plastics employed as precursors for their production, since the pyrolysis of the resin is associated with a loss of matter.

It can be seen from the above description that a wide diversity of friction materials with a composition and fine structure tailor-made for the intended use can be produced with the process according to the invention. A common feature of all the preferred friction materials is the ridge and furrow structure, which acts in a comparably advantageous manner for the removal of oil to that of the milled oil furrows on friction materials of the prior art.

Preferred Embodiment Example

A woven fabric with channel-like depressions running diagonally in a twill weave 2/2, according to FIG. 1 and FIG. 2, formed the starting material for the friction material. This woven fabric was impregnated with a resol liquid resin system such that the resin content, based on the total weight, is 50%. The curing operation of the prepreg produced in this manner was started with a treatment at a temperature of approx. 80° C. over a period of approx. So min. The pressing pressure in the context of the mechanical pressing operation according to FIG. 4 was applied in two stages, a first approx. 10 minute pressing stage starting approx. 50 min after the start of the curing operation and taking place under a pressing pressure of approx. $4 \cdot 10^5$ Pa, while for the subsequent second pressing stage the pressing pressure was increased to approx. $7 \cdot 10^5$ Pa, the second pressing stage lasting approx. 65 min. Preferably, the curing temperature was increased at the same time as the start of the first pressing stage such that it reached about 130° C. shortly before the start of the second pressing stage. The curing temperature was then increased again in the course of the second pressing stage, preferably to approx. 150° C. The second pressing stage with lowering of the pressing pressure to ambient pressure also ended approximately simultaneously with the lowering of the curing temperature to ambient temperature. The total curing time between the start of the increase in the curing temperature and lowering thereof to ambient temperature was approx. 125 min.

Summarizing, the mechanical pressing operation was consequently started with a time displacement after the start of the curing period, i.e. at a point in time within the curing period, and was ended substantially at the same time as the end of the curing period. The result was a friction material according to FIG. 5 and FIG. 6, in which the original structure of the woven fabric of ridges and furrows is still detectably maintained and which has the material parameters according to row 2 in Table 1.

Alternatively, the mechanical pressing operation of the prepreg could also already be started before the start of the curing period and the pressing operation ended at any desired point in time within the curing period or also at the end thereof. It is also possible to start and end the pressing operation before the start of the curing period.

Comparison with an Unpressed Specimen

To establish the differences of the material properties between six specimens produced by the preferred process described above and a specimen having the same resin content, based on the weight, of 50%, but in contrast unpressed, the specimens were subjected to a compression test and a resilience test in accordance with the test standard ASTM F 36-66. According to this standard, the thickness a of any specimen is measured first in the non-loaded state, after 15 s loading with 22.2 N (5 lbf), under which a thickness p is established, after a further 60 s loading with 1,112 N (250 lbf), under which a thickness m is established, and after a further 15 s loading with 22.2 N (5 lbf), under which a thickness r is established (see Table 2).

TABLE 2

| | Compressibility and resilience of the friction material | | | | | | | |
|---|---|---|---|---|---|---|---|---|
| Specimen no. | Thickness (a) mm | Thickness (p) mm | Thickness (m) mm | Thickness (r) mm | Compressibility μm | Compressibility % | Resilience μm | Resilience % |
| 1 | 0.313 | 0.310 | 0.284 | 0.306 | 26.2 | 8.4 | 21.9 | 83.6 |
| 2 | 0.311 | 0.308 | 0.280 | 0.304 | 27.4 | 8.9 | 23.6 | 86.1 |
| 3 | 0.297 | 0.294 | 0.267 | 0.290 | 27.0 | 9.2 | 23.1 | 85.4 |
| 4 | 0.295 | 0.291 | 0.266 | 0.287 | 25.1 | 8.6 | 21.0 | 83.7 |
| 5 | 0.293 | 0.291 | 0.265 | 0.286 | 25.4 | 8.7 | 21.0 | 82.5 |
| 6 | 0.288 | 0.286 | 0.261 | 0.282 | 24.7 | 8.6 | 20.2 | 81.6 |

From the thicknesses p and m measured on the specimens, the compressibility was determined in μm, which corresponds to the difference between the thickness p after 15 s loading at 22.2 N and the thickness m after 60 s loading at 1,112 N. The relative compressibility in % was then determined from the ratio of the compression to the thickness p.

The resilience of the specimens was furthermore also calculated in μm, which corresponds to the difference between the thickness r and the thickness p. Finally, the relative resilience in % was calculated from the ratio of the resilience to the compressibility.

The result found is that the relative compressibility of the specimen which was not cured under pressure was 55.6%, and the relative resilience thereof was 20.4%. In contrast, the relative compressibility of the six specimens cured in accordance with the stated pressure/temperature regimes was only between 8.4% and 9.2%, and the relative resilience was between 81.6% and 86.1%. Preferably, the relative compressibility of the friction material according to the invention is between 8% and 10% and its relative resilience is between 80% and 90%. It follows from this that the friction material according to the invention, i.e. cured under pressure, is considerably more dimensionally stable under a pressure loading.

This application claims the priority, under 35 U.S.C. § 119, of German patent application No. 103 34 881.6, filed Jul. 29, 2003; the entire disclosure of the prior application is herewith incorporated by reference.

We claim:

1. A process for the production of a carbon-fiber reinforced friction material for wet-friction elements, the process which comprises:
    providing a sheet-like carbon fiber woven fabric having channel-shaped depressions on at least one surface of the carbon fiber woven fabric by weaving threads of heat-stabilized polyacrylonitrile fibers to a woven fabric of threads of heat-stabilized polyacrylonitrile fibers, the threads of heat-stabilized polyacrylonitrile fibers being woven with one another to form channel-shaped depressions extending continuously over at least one entire surface of the woven fabric of threads of heat-stabilized polyacrylonitrile fibers and subsequently carbonizing the woven fabric of threads of heat-stabilized polyacrylonitrile fibers, or by heat-stabilizing a woven fabric of threads of polyacrylonitrile fibers, the threads of polyacrylonitrile fibers being woven with one another to form channel-shaped depressions extending continuously over at least one entire surface of the woven fabric of threads of polyacrylonitrile fibers, and subsequently carbonizing the heat-stabilized woven fabric;
    impregnating the carbon fiber woven fabric with a binder to form a binder-impregnated fiber material;
    curing the binder-impregnated fiber material over a curing period at a curing temperature in a range between 50 and 180° C.; and
    mechanically pressing surfaces of the binder-impregnated fiber material with a pressing mold at a time prior to the curing period and during the curing period or at a time during the curing period to produce a carbon-fiber reinforced plastic finished friction material end product for wet-friction elements.

2. The process according to claim 1, which comprises pressing and curing the binder-impregnated fiber material into synchronizing ring linings.

3. The process according to claim 1, which comprises pressing at a pressing pressure is in a range between 4 and $8 \cdot 10^5$ Pa.

4. The process according to claim 1, which comprises setting a content of the binder, based on a total weight of the friction material including the woven fabric and the binder, in a range between 25 and 50 wt. %.

5. The process according to claim 1, wherein the binder is a phenolic resin.

6. The process according to claim 1, which comprises, prior to the pressing step, lining the binder-impregnated fiber material on each side with a release film.

7. The process according to claim 1, which comprises weaving the woven fabric with a twill weave.

8. The process according to claim 1, which comprises pressing with a pressing mold having substantially smooth pressing surfaces facing the binder-impregnated fiber material.

9. The process according to claim 6, which comprises pressing with at least one of the pressing mold and a release film having at least one structured surface facing the binder-impregnated fiber material.

10. The process according to claim 9, wherein at least one of the pressing mold and the release film is configured to form channel depressions in at least one surface of the binder-impregnated fiber material.

11. The process according to claim 1, which comprises adding particles of graphite or carbon black to the binder.

12. The process according to claim 1, wherein the binder is partly or completely carbonized.

13. The process according to claim 1, which comprises starting the pressing step with a time delay after a start of the curing period and ending the pressing step substantially simultaneously with an end of the curing period.

14. A process for the production of a composite friction material for wet-friction elements, the process which comprises:
    providing a sheet-like carbon fiber woven fabric having channel-shaped depressions on at least one surface of the carbon fiber woven fabric by weaving threads of heat-stabilized polyacrylonitrile fibers to a woven fabric of threads of heat-stabilized polyacrylonitrile fibers, the threads of heat-stabilized polyacrylonitrile fibers being woven with one another to form channel-shaped depressions extending continuously over at least one entire surface of the woven fabric of threads of heat-stabilized polyacrylonitrile fibers and subsequently carbonizing the woven fabric of threads of heat-stabilized polyacrylonitrile fibers, or by heat-stabilizing a woven fabric of threads of polyacrylonitrile fibers, the threads of polyacrylonitrile fibers being woven with one another to form channel-shaped depressions extending continuously over at least one entire surface of the woven fabric of threads of polyacrylonitrile fibers, and subsequently carbonizing the heat-stabilized woven fabric;
    impregnating the carbon fiber woven fabric with a binder to form a binder-impregnated fiber material;
    curing the binder-impregnated fiber material over a curing period at a curing temperature in a range between 50 and 180° C.; and
    mechanically pressing surfaces of the binder-impregnated fiber material with a pressing mold at a time prior to the curing period and during the curing period or at a time during the curing period to produce a finished friction material end product for wet-friction elements, the finished friction material being a composite formed of a matrix of the cured binder reinforced by the carbon fiber woven fabric.

15. A process for the production of a carbon-fiber reinforced friction material for wet-friction elements, the process which comprises:
    providing a sheet-like carbon fiber woven fabric having channel-shaped depressions on at least one surface of the carbon fiber woven fabric by weaving threads of heat-stabilized polyacrylonitrile fibers to a woven fabric of threads of heat-stabilized polyacrylonitrile fibers, the threads of heat-stabilized polyacrylonitrile fibers being woven with one another to form channel-shaped depressions extending continuously over at least one entire surface of the woven fabric of threads of heat-stabilized polyacrylonitrile fibers and subsequently carbonizing the woven fabric of threads of heat-stabilized polyacrylonitrile fibers, or by heat-stabilizing a woven fabric of threads of polyacrylonitrile fibers, the threads of polyacrylonitrile fibers being woven with one another to form channel-shaped depressions extending continuously over at least one entire surface of the woven fabric of threads of polyacrylonitrile fibers, and subsequently carbonizing the heat-stabilized woven fabric;

impregnating the carbon fiber woven fabric with a binder to form a binder-impregnated fiber material;

curing the binder-impregnated fiber material over a curing period at a curing temperature in a range between 50 and 180° C.;

mechanically pressing surfaces of the binder-impregnated fiber material with a pressing mold at a time prior to the curing period and during the curing period or at a time during the curing period to produce a carbon-fiber reinforced plastic; and partially or completely carbonizing the cured binder in the carbon-fiber reinforced plastic.

16. A process for the production of a friction material for wet-friction elements, the process consisting of:

providing a sheet-like carbon fiber woven fabric having channel-shaped depressions on at least one surface of the carbon fiber woven fabric by weaving threads of heat-stabilized polyacrylonitrile fibers to a woven fabric of threads of heat-stabilized polyacrylonitrile fibers, the threads of heat-stabilized polyacrylonitrile fibers being woven with one another to form channel-shaped depressions extending continuously over at least one entire surface of the woven fabric of threads of heat-stabilized polyacrylonitrile fibers and subsequently carbonizing the woven fabric of threads of heat-stabilized polyacrylonitrile fibers, or by heat-stabilizing a woven fabric of threads of polyacrylonitrile fibers, the threads of polyacrylonitrile fibers being woven with one another to form channel-shaped depressions extending continuously over at least one entire surface of the woven fabric of threads of polyacrylonitrile fibers, and subsequently carbonizing the heat-stabilized woven fabric;

impregnating the carbon fiber woven fabric with a binder to form a binder-impregnated fiber material;

curing the binder-impregnated fiber material over a curing period at a curing temperature in a range between 50 and 180° C.; and mechanically pressing surfaces of the binder-impregnated fiber material with a pressing mold at a time prior to the curing period and during the curing period or at a time during the curing period to produce a finished friction material end product for wet-friction elements.

17. The process according to claim 1, wherein the friction material has a relative compressibility of between 8% and 10% and a relative resilience of between 80% and 90%.

18. The process according to claim 1, wherein the carbon-fiber reinforced plastic finished friction material end product has channel-shaped depressions on at least one surface.

19. The process according to claim 1, wherein the binder is a resin, and fiber strands of the carbon fiber woven fabric in the carbon-fiber reinforced plastic finished friction material end product are embedded in a matrix of cured resin.

20. The process according to claim 1, wherein the binder is a resin, and the channel-shaped depressions of the carbon fiber woven fabric reinforcing the carbon fiber reinforced plastic finished friction material end product are partly filled with cured resin.

21. The process according to claim 1, which comprises weaving the woven fabric with a diagonal weave.

22. The process according to claim 14, which comprises weaving the woven fabric with a diagonal weave.

23. The process according to claim 15, which comprises weaving the woven fabric with a diagonal weave.

24. The process according to claim 16, which comprises weaving the woven fabric with a diagonal weave.

* * * * *